(12) United States Patent
Liu et al.

(10) Patent No.: US 8,478,189 B2
(45) Date of Patent: Jul. 2, 2013

(54) RELAY COMMUNICATION SYSTEM AND A METHOD FOR TRANSMITTING DATA IN THE SAME SYSTEM

(75) Inventors: Yang Liu, Shenzhen (CN); Hongyun Qu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 210 days.

(21) Appl. No.: 12/993,473

(22) PCT Filed: Jan. 23, 2009

(86) PCT No.: PCT/CN2009/070311
§ 371 (c)(1),
(2), (4) Date: Nov. 18, 2010

(87) PCT Pub. No.: WO2009/140866
PCT Pub. Date: Nov. 26, 2009

(65) Prior Publication Data
US 2011/0070823 A1    Mar. 24, 2011

(30) Foreign Application Priority Data

May 20, 2008    (CN) .......................... 2008 1 0098021

(51) Int. Cl.
*H04B 3/38*    (2006.01)
(52) U.S. Cl.
USPC .................. 455/7; 455/9; 455/10; 455/11.1; 455/13.1; 455/450; 370/315; 370/326; 370/329; 370/330

(58) Field of Classification Search
USPC .......................... 455/450–455, 7, 9–13.1, 15
See application file for complete search history.

(56) References Cited

U.S. PATENT DOCUMENTS

| | | | |
|---|---|---|---|
| 5,553,076 A | | 9/1996 | Behtash et al. |
| 7,751,776 B2 * | | 7/2010 | Fujita .................................. 455/7 |
| 2007/0268863 A1 | | 11/2007 | Venkatachalam |
| 2008/0045144 A1 * | | 2/2008 | Fujita .................................. 455/7 |
| 2008/0285447 A1 * | | 11/2008 | Yamasaki ...................... 370/231 |
| 2009/0017845 A1 | | 1/2009 | Wu et al. |
| 2009/0227202 A1 * | | 9/2009 | Doppler et al. .............. 455/11.1 |
| 2010/0189050 A1 * | | 7/2010 | Beems Hart et al. ......... 370/329 |

FOREIGN PATENT DOCUMENTS

| | | |
|---|---|---|
| CN | 1878104 A | 12/2006 |
| CN | 1914872 A | 2/2007 |
| CN | 1914872 A | 2/2007 |
| CN | 101043700 A | 9/2007 |
| CN | 101064547 A | 10/2007 |

* cited by examiner

*Primary Examiner* — Fayyaz Alam
(74) *Attorney, Agent, or Firm* — Li & Cai Intellectual Property (USA) Office

(57) ABSTRACT

A relay communication system and a method for transmitting data in the same system, wherein the method for transmitting data comprises: a relay station notifying a transmitting terminal and a receiving terminal of air interface resources which are required when the transmitting terminal transmits data and when the receiving terminal receives the data (S102); the transmitting terminal transmitting the data to the relay station on the air interface recourses, and the relay station forwarding the data to the receiving terminal on the air interface resources (S104). By using the present invention, the times of forwarding the data along a data transmission path can be effectively reduced, and thus improves data transmission efficiency.

3 Claims, 5 Drawing Sheets

RELAY COMMUNICATION SYSTEM AND A METHOD FOR TRANSMITTING DATA IN THE SAME SYSTEM

CROSS-REFERENCE TO RELATED APPLICATIONS

This application is a U.S. national phase application under the provisions of 35 U.S.C. §371 of International Patent Application No. PCT/CN09/70311 filed Jan. 23, 2009, which in turn claims priority of Chinese Patent Application No. 200810098021.6 filed May 20, 2008. The disclosures of such international patent application and Chinese priority patent application are hereby incorporated herein by reference in their respective entireties, for all purposes.

FIELD OF THE INVENTION

The present invention relates to the field of communication, and in particular, to a relay communication system and a method for transmitting data in the same system.

BACKGROUND ART

Usually, a wireless communication system uses an electromagnetic wave and a fixed/mobile wireless communication terminal (for example, a mobile wireless phone or a laptop contained a wireless communication card, and etc., can be called terminals for short) for communicating. Generally, terminals are located within the radio coverage area of a system, and the electromagnetic wave frequencies assigned to such terminals are divided into multiple carrier frequencies as radio communication channels. The wireless communication system provides radio coverage within a certain geographic area using a designated radio channel through a Base Station (BS for short), and the geographic area is called a Cell. Usually, the base station is located at the center of the cell.

The coverage area of a wireless network can be affected by various factors. For example, high buildings may shield the radio signals of the base station, which leads to a severe attenuation of signals within a certain area, and signals at the edge of the cell will also be attenuated, thereby increasing the probability of the reception error of the terminal. The capacity requirement of the wireless communication system can also be affected by many factors, for example: when the number of users increases sharply or the amount of traffic increases sharply, the system capacity is required to be expanded; while in a rural area, the capacity of one base station usually cannot be fully used in the coverage area, and then the coverage range of the system needs to be expanded to use the redundant system capacity.

To expand the system coverage range or the system capacity, one or more Relay Stations (RS for short) can be set between a base station supporting multi-hop relay and a terminal (hereinafter the wireless communication system including the relay station is called a system for short). The relay station can be used to relay the signal from the base station to the terminal (downlink) or from the terminal to the base station (uplink). After using the relay station, the signal transmission quality of a communication link can be improved effectively and thus the object of expanding the system coverage range or increasing the system capacity can be achieved.

The communication path that a terminal accesses to a base station via one or more hops of relay station is called a relay path. The relay station directly connected with the terminal is called an access relay station. The communication link between the access relay station and the terminal is called an access link. On the relay path, the access relay station can communicate with the base station through other relay stations. On the relay path, the communication links between the relay stations and between the relay stations and the base station are called relay links. The relay station can be fixed, roaming or mobile.

As described above, current relay-based wireless communication methods are mostly pure uplink transmission or downlink transmission, that is, data sent by a terminal must be first uplink transmitted to the base station which then downlink transmits the data to a target terminal. In the case of a relative small distance between a sending end and a transmitting end, the above processing methods obviously prolong the data transmission path, and thus data transmission delay is increased correspondingly.

However, no technical solution that can solve this problem has been proposed so far.

SUMMARY OF THE INVENTION

The present invention is made with the above problem taken into consideration. Therefore, the main object of the present invention is to provide an improved relay communication system and a data transmitting method thereof, to solve the problem in the related art that a long communication delay is resulted since the communication between terminals must pass through a base station.

To achieve the above object, according to one aspect of the present invention, a method for transmitting data in a relay communication system is provided, wherein the relay communication system can comprise one or more relay stations, one or more transmitting terminals, and one or more receiving terminals.

The method according to the present invention comprises: step S102, a relay station notifying of a transmitting terminal and a receiving terminal of air interface resources which are required when the transmitting terminal transmits data and when the receiving terminal receives the data; step S104, the transmitting terminal transmitting the data to the relay station on the air interface recourses, and the relay station forwarding the data to the receiving terminal on the air interface resources.

Preferably, in the case that the transmitting terminal and the receiving terminal access through the same relay station, and if this relay station schedules the air interface resources required for transmitting the data, then the relay station responds to a resource request of the transmitting terminal or the relay station proactively arranges the air interface resources, and sends a corresponding resource assignment message to the transmitting terminal and the receiving terminal; the transmitting terminal transmits the data to the relay station on the air interface resources according to the received resource assignment message, and the relay station transmits the received data to the receiving terminal; the receiving terminal receives the data from the relay station on the air interface resources according to the received resource assignment message.

Preferably, in the case that the transmitting terminal and the receiving terminal access to the same base station in the relay communication system through the same relay station, and if this base station schedules the air interface resources required for transmitting the data, then the base station responds to the resource request of the transmitting terminal or the base station proactively arranges the air interface resources and relay resources, and sends a corresponding resource assignment message to the relay station; the relay station parses the received resource assignment message to obtain the air interface resources and the relay resources, and notifies the transmitting terminal and the receiving terminal of the air interface resources; the transmitting terminal transmits the data to the relay station on the air interface resources as notified, and the relay station transmits the received data to the receiving terminal; the receiving terminal receives the data from the relay station on the air interface resources as notified.

Preferably, in the case that the transmitting terminal and the receiving terminal access to different base stations in the relay communication system through the same relay station, and if the accessed base stations schedule the air interface resources required for transmitting the data, then a first base station to which the transmitting terminal accesses and a second base station to which the transmitting terminal accesses respond to the resource request of the transmitting terminal or proactively negotiate through a backbone network, and the first base station and the second base station assign the air interface resources to the transmitting terminal and the receiving terminal and assign relay resources to the relay station, and notify the relay station through a corresponding resource assignment message; the relay station parses the received resource assignment message to obtain the air interface resources and the relay resources, and notifies the transmitting terminal and the receiving terminal of the air interface resources; the transmitting terminal transmits the data to the relay station on the air interface resources as notified, and the relay station transmits the received data to the receiving terminal; the receiving terminal receives the data from the relay station on the air interface resources as notified.

Preferably, in the case that the transmitting terminal accesses through a first relay station and the receiving terminal accesses through a second relay station, and if the first relay station and the second relay station schedule the air interface resources required for transmitting the data, respectively, then the first relay station to which the transmitting terminal accesses responds to the resource request of the transmitting terminal or proactively assigns transmission resources to the transmitting terminal, notifies the transmitting terminal of the transmission resources, receives the data of the transmitting terminal, and directly negotiates with the second relay station to which the receiving terminal accesses or negotiates through the base station and a backbone network to obtain the resources required when the first relay station transmits data to the second relay station; the second relay station receives data from the first relay station according to a negotiation result, arranges reception resources for the receiving terminal and notifies the receiving terminal of the reception resources, and transmits the data to the second relay station; the receiving terminal receives the data from the second relay station on the reception resources.

Preferably, in the case that the transmitting terminal accesses through a first relay station and the receiving terminal accesses through a second relay station to the same base station in the relay communication system, respectively, and if the base station schedules the air interface resources required for transmitting the data, then the base station responds to the resource request of the transmitting terminal or proactively assigns transmission resources to the transmitting terminal, notifies the transmitting terminal of the transmission resources through the first relay station to which the transmitting terminal accesses, receives the data of the transmitting terminal, and negotiates with the second relay station to which the receiving terminal accesses to obtain the resources required when the first relay station transmits data to the second relay station; the second relay station receives the data from the first relay station according to a negotiation result, arranges reception resources for the receiving terminal and notifies the receiving terminal of the reception resources, and transmits the data to the second relay station; the receiving terminal receives the data from the second relay station on the reception resources.

Preferably, in the case that the transmitting terminal accesses to a first base station in the relay communication system through a first relay station and the receiving terminal is accessed to a second base station in the relay communication system through a second relay station, and if the accessed base stations schedule the air interface resources required for transmitting the data, then the first base station to which the transmitting terminal accesses and the second base station to which the transmitting terminal accesses respond to a resource request of the transmitting terminal or proactively perform a backbone network negotiation, assign transmission resources to the transmitting terminal through the first relay station and assign reception resources for the receiving terminal through the second relay station; the first relay station receives the data of the receiving terminal and negotiates with the second relay station to obtain the resources required when the first relay station transmits data to the second relay station, the first relay station transmits the data from the transmitting terminal to the receiving terminal through the second relay station; the receiving terminal receives the data from the second relay station on the reception resources.

Preferably, after the relay station, or the base station to which the transmitting terminal accesses and/or the base station to which the receiving terminal accesses have received the resource request of the transmitting terminal, and if the air interface resources cannot be arranged, the method further comprises: sends a resource application reject message to the transmitting terminal; in response to the resource application reject message, a transmitting party of the transmitting terminal re-performs resource application or abandons the resource application.

According to another aspect of the present invention, a method for transmitting data in a relay communication system is further provided, the relay communication system comprising one or more relay stations, one or more transmitting terminals, and one or more receiving terminals.

The method according to the present invention comprises: the transmitting terminal transmits data to the relay station, and the relay station forwards the data to the receiving terminal.

According to another aspect of the present invention, a method for transmitting data in a relay communication system is further provided, the relay communication system comprises one or more relay stations, one or more transmitting terminals, and one or more receiving terminals.

The method according to the present invention comprises: the relay station transmits air interface resources required when the transmitting terminal transmits data to the transmitting terminal through one or more relay stations or directly; the transmitting terminal transmits the data to the relay station on the air interface resources through one or more relay stations or directly; the relay station transmits the air interface resources required when the transmitting terminal receives data and the data to the receiving terminal through one or more relay stations or directly; the receiving terminal receives the data on the air interface resources.

According to another aspect of the present invention, a relay communication system is further provided.

The system according to the present invention comprising: one or more relay stations, one or more transmitting terminals, and one or more receiving terminals, wherein the relay station comprises: a notifying module, configured to notify the transmitting terminal and the receiving terminal of air interface resources which are required when the transmitting terminal transmits data and when the receiving terminal receives data; a receiving module, configured to receive the data from the transmitting terminal on the air interface recourses; a forwarding module, configured to forward the data from the transmitting terminal to the receiving terminal on the air interface resources.

By way of the above technical solutions of the present invention, the relay station forwards the data from the transmitting terminal to the receiving terminal through the air interface resources, which can effectively reduce the number of times of forwarding data along the data transmission path, thereby improving the data transmission efficiency and saving network resources.

BRIEF DESCRIPTION OF ACCOMPANYING DRAWINGS

The accompanying drawings herein are used to provide further understanding of the present invention and constitute a part of the present application. The schematic embodiments of the present invention and the description thereof are used to explain the present invention and do not constitute improper limitations on the same. As shown in the accompanying drawings.

DETAILED DESCRIPTION OF THE INVENTION

Functional Overview

The main thought of the present invention is: in a wireless communication system comprising at least one relay station, the data transmitted by a wireless terminal is directly forwarded (not pass a base station) by the relay station to other terminals, wherein wireless terminals can access to a base station through the same relay station or through different relay stations. The present invention can improve data transmission efficiency.

Preferable embodiments of the present invention will be described hereinafter in conjunction with the accompanying drawings, and it should be understandable that the preferable embodiments described herein are only used to describe and explain the present invention and do not intend to restrict the same.

Method Embodiment

In the embodiment of the present invention, a method for transmitting data in a relay communication system is provided, wherein the relay communication system can comprise one or more relay stations, one or more transmitting terminals, and one or more receiving terminals.

Figure 1:
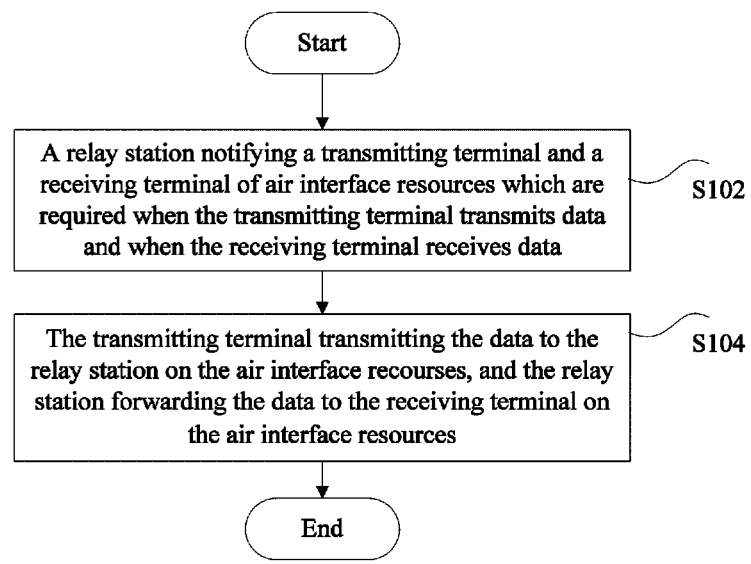
FIG. 1 is a flow chart of the method for transmitting data in a relay communication system according to the embodiments of the present invention.

FIG. 1 is a flow chart of the method for transmitting data in a relay communication system according to the embodiments of the present invention. As shown in FIG. 1, the method comprises: step S102, the relay station notifying the transmitting terminal and the receiving terminal of air interface resources which are required when the transmitting terminal transmits data and when the receiving terminal receives the data; and step S104, the transmitting terminal transmitting the data to the relay station on the air interface recourses, and the relay station forwarding the data to the receiving terminal on the air interface resources.

In the method shown in FIG. 1, step S102 and step S104 may not be executed in a strict order, and can be split and mixed together. That is, besides the method indicated by the natural order, the other possible scenario is the transmitting terminal transmits data to the relay station after the relay station notifying the transmitting terminal of air interface resources which are required for transmitting data, and after that the relay station forwards the data to the receiving terminal after the relay station notifying the receiving terminal of air interface resources which are required for receiving data.

According to the embodiment of the present invention, the relay station transmits the air interface resources required when the transmitting terminal transmits data to the transmitting terminal through one or more relay stations or directly; the transmitting terminal transmits the data to the relay station on the air interface resources through one or more relay stations or directly; the relay station transmits the receiving terminal the air interface resources required when the transmitting terminal receives the data and the data to the receiving terminal through one or more relay stations or directly; and thus the receiving terminal receives the data on the air interface resources.

The embodiment of the present invention will be detailed hereinafter using the World Interoperability for Microwave Access (WiMAX for short) as an example.

The WiMAX is a Broadband Wireless Access Metropolitan Area Network technology based on an IEEE802.16 standard. The basic object of the WiMAX is to ensure the interconnection and interoperability of wireless equipments of different manufacturers in a metropolitan area network access environment, which mainly aims at providing high speed broadband access of "Last Kilometer" for homes, enterprises and mobile communication networks and is used for future personal mobile communication services. The IEEE802.16 standard constitutes specifications of a physical layer (PHY) and a Medium Access Control (MAC for short) layer, and is a new air interface standard for a microwave frequency band, wherein an IEEE802.16m comprising a relay structure currently is the newest standard technology.

In the schematic view of the frame structure according to the embodiment of the present invention, the abscissa represents the number of OFDMA symbols or time, and the ordinate represents frequency. The data segment formed by the abscissa and the ordinate can be regarded as resource blocks for various communication devices to transmit and receive data. The time order of respective resource blocks can be exchanged on demand.

Embodiment 1: the transmitting terminal (i.e., a transmitting party) transmitting the data and the receiving terminal (i.e., a receiving party) receiving the data access to the same base station through the same relay station, and the air interface resources are scheduled by the relay station itself or scheduled by the base station.

1.1 When the air interface resources are scheduled by the relay station itself, the air interface resources are assigned proactively by the relay station, or the transmitting party applies for the air interface resources from the relay station;

1.1.1 When the air interface resources are assigned proactively by the relay station, the relay station arranges resources and sends a resource assignment message to the transmitting party and the receiving party, the transmitting party transmits to the relay station on a corresponding resource according to the resource assignment message as received, the relay station directly transmits the data as received to the receiving party, and the receiving party receives the data from the relay station on a corresponding resource according to the resource assignment message as received; and 1.1.2 When the transmitting party applies for the air interface resources from the relay station, the transmitting party directly applies for transmitting data resources from the relay station;

1.1.2.1 After receiving the application, the relay station arranges resources and sends a resource assignment message to the transmitting party and the receiving party, the transmitting party transmits to the relay station on a corresponding resource according to the resource assignment message as received, the relay station directly transmits the data as received to the receiving party, and the receiving party receives the data from the relay station on a corresponding resource according to the resource assignment message as received;

1.1.2.2 When the relay station receives the application but cannot perform a scheduling, it sends a resource application reject message to the transmitting party, and the transmitting party waits a period of time according to the application reject information as received and then re-sends the application or abandons the sending;

1.2 When the air interface resources are scheduled by the base station, the air interface resources are assigned proactively by the base station, or the transmitting party applies for the air interface resources from the base station;

1.2.1 The air interface resources being assigned proactively by the base station;

1.2.1.1 The base station arranges resources for the relay station, the transmitting party and the receiving party and sends all resource assignment messages to the relay station, the relay station parses the resource assignment messages to obtain its own relay resources and the resource assignment messages of the transmitting party and the receiving party and sends the resource assignment messages of the transmitting party and the receiving party to the transmitting party and the receiving party, the transmitting party transmits to the relay station on a corresponding resource according to the resource assignment message as received, the relay station receives the data of the transmitting party on a corresponding resource according to the resource assignment message as received, the relay station transmits the data as received to the receiving party according to the resource assignment message as received, and the receiving party receives the data from the relay station on a corresponding resource according to the resource assignment message as received;

1.2.2 When the transmitting party applies for the air interface resources from the base station, a transmission data resource application of the transmitting party must be relayed to the base station by the relay station;

1.2.2.1 After receiving the application, the base station arranges resources for the relay station, the transmitting party and the receiving party and sends all resource assignment messages to the relay station, the relay station parses the resource assignment messages to obtain its own relay resources and the resource assignment messages of the transmitting party and the receiving party and sends the resource assignment messages of the transmitting party and the receiving party to the transmitting party and the receiving party, the transmitting party transmits to the relay station on a corresponding resource according to the resource assignment message as received, the relay station receives the data of the transmitting party on a corresponding resource according to the resource assignment message as received, the relay station transmits the above data as received to the receiving party according to the resource assignment message as received, and the receiving party receives the data from the relay station on a corresponding resource according to the resource assignment message as received; and 1.2.2.2 in the case that the base station cannot schedule resources after receiving the application, it sends a resource application reject message to the relay station, the relay station parses the resource application reject message to obtain the resource application reject message of the transmitting party and forwards the same to the transmitting party, and the transmitting party waits a period of time according to the application reject information as received and then re-sends the application or abandons the sending.

Example 1

Figure 2A:
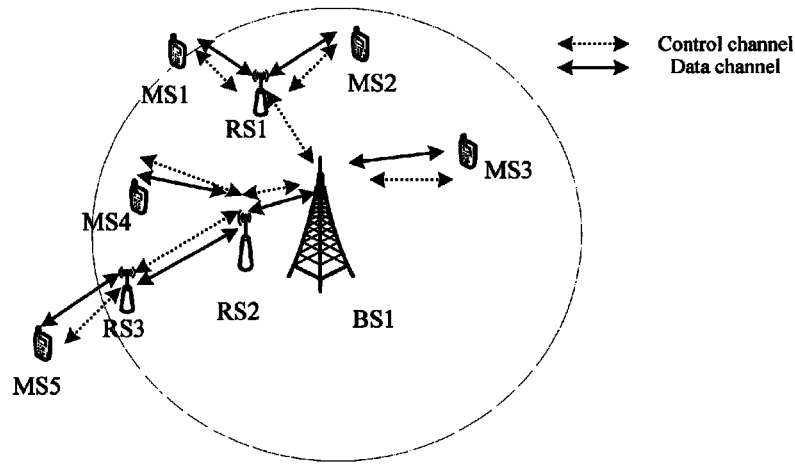
FIG. 2a is a schematic view of the network topology of example 1 that the method according to the embodiment of the present invention is used in an IEEE 802.16 system.

FIG. 2a is a schematic view of the network topology according to example 1 of the present invention, and as shown in FIG. 2a, both a terminal (MS1) transmitting data and a terminal (MS2) receiving data access the same relay station RS1.

Specifically, if the air interface resources can be scheduled by the RS1 itself, the MS1 can directly apply for transmitting data resources from the RS1, and if the RS1, after receiving the application, can arrange resources, it arranges resources and sends a resource assignment message to the MS1 and MS2, the MS1 transmits to the RS1 on a corresponding resource according to the resource assignment message as received, the RS1 directly transmits the data as received to the MS2, and the MS2 receives the data from the relay station on a corresponding resource according to the resource assignment message as received;

Also, if the RS1 can directly assign the resources, it directly arranges resources and sends a resource assignment message to the MS1 and MS2, the MS1 transmits to the RS1 on a corresponding resource according to the resource assignment message as received, the RS1 directly transmits the above data as received to the MS2, and the MS2 receives the data from the relay station on a corresponding resource according to the resource assignment message as received; and If the air interface resources can only be scheduled by the base station, the transmission data resource application of the MS1 must be relayed to a BS1 through the RS1, if the BS1, after receiving the application, can arrange resources, it arranges resources for the RS1, MS1 and MS2 and sends all resource assignment messages to the RS1, the RS1 parses the resource assignment messages to obtain its own relay resources and the resource assignment messages of the MS1 and MS2 and sends the resource assignment messages of the MS1 and MS2 to the MS1 and MS2, the MS1 transmits to the RS1 on a corresponding resource according to the resource assignment message as received, the RS1 receives the data of the MS1 on a corresponding resource according to the resource assignment message as received, the RS1 transmits the data as received to the MS2 according to the resource assignment message as received, and the MS2 receives the data from the RS1 on a corresponding resource according to the resource assignment message as received.

In addition, if the BS1 can directly arrange resources, it arranges resources for the RS1, MS1 and MS2 and sends all resource assignment messages to the RS1, the RS1 parses the resource assignment messages to obtain its own relay resources and the resource assignment messages of the MS1 and MS2 and sends the resource assignment messages of the MS1 and MS2 to the MS1 and MS2, the MS1 transmits to the RS1 on a corresponding resource according to the resource assignment message as received, the RS1 receives the data of the MS1 on a corresponding resource according to the resource assignment message as received, the RS1 transmits the data as received to the MS2 according to the resource assignment message as received, and the MS2 receives the data from the RS1 on a corresponding resource according to the resource assignment message as received.

Figure 2B:
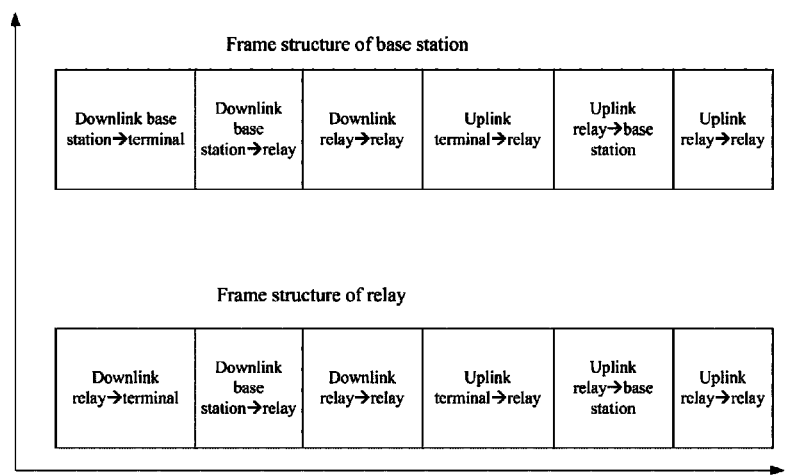
FIG. 2b is a schematic view of the frame structure of example 1 that the method according to the embodiment of the present invention is used in an IEEE 802.16 system.

FIG. 2b is a schematic view of the frame structure according to example 1 of the present invention, and as shown in FIG. 2b, the MS1 can transmit the data of the MS2 to the RS1 within an area of "uplink terminal→relay". The RS1 can directly transmit the data of the MS1 as received to the MS2 within an area of "downlink relay→terminal". However, according to the related art, corresponding data is transmitted to the BS1 within an area of "uplink relay→base station", then the data is received within an area of "downlink base station→relay" and is finally transmitted to the MS2. Compared with the related art, the embodiment of the present invention reduces the number of times of forwarding data along the data transmission path.

Embodiment 2: the transmitting party and the receiving party access to different base stations through the same relay station, and the air interface resources are scheduled by the relay station itself or scheduled by the base stations.

2.1 When the air interface resources are scheduled by the relay station itself, the air interface resources are assigned proactively by the above relay station, or the transmitting party applies for the air interface resources from the relay station;

2.1.1 When the air interface resources are assigned proactively by the relay station, the relay station arranges resources and sends a resource assignment message to the transmitting party and the receiving party, the transmitting party transmits to the relay station on a corresponding resource according to the resource assignment message as received, the relay station directly transmits the data as received to the receiving party, and the receiving party receives the data from the relay station on a corresponding resource according to the resource assignment message as received; and 2.1.2 When the transmitting party applies for the air interface resources from the above relay station, the transmitting party applies for transmitting data resources from the relay station;

2.1.2.1 After receiving the application, the relay station respectively arranges resources for the transmitting party and the receiving party and respectively sends resource assignment messages to the transmitting party and the receiving party, the transmitting party transmits to the relay station on a corresponding resource according to the resource assignment message as received, the relay station directly transmits the data as received to the receiving party, and the receiving party receives the data from the relay station on a corresponding resource according to the resource assignment message as received;

2.1.2.2 When the relay station receives the above application but cannot perform resource scheduling, it sends a resource application reject message to the transmitting party, and the transmitting party waits a period of time according to the application reject information as received and then re-sends the application or abandons the sending;

2.2 When the air interface resources are scheduled by the base stations, the air interface resources are assigned proactively by the above base stations, or the transmitting party applies for the air interface resources from the above base stations;

2.2.1 When the air interface resources are assigned proactively by the base stations, the two base stations to which the relay station accesses arrange resources for the relay station, the transmitting party and the receiving party through negotiation at a backbone network and send all resource assignment messages to the relay station, the relay station parses the resource assignment messages to obtain its own relay resources and the resource assignment messages of the transmitting party and the receiving party and sends the resource assignment messages of the transmitting party and the receiving party to the transmitting party and the receiving party, the transmitting party transmits to the relay station on a corresponding resource according to the resource assignment message as received, the relay station receives the data of the transmitting party on a corresponding resource according to the resource assignment message as received, the relay station transmits the data as received to the receiving party according to the resource assignment message as received, and the receiving party receives the data from the relay station on a corresponding resource according to the resource assignment message as received;

2.2.2 When the transmitting party applies for the air interface resources from the base stations, the transmission data resource application of the transmitting party must be relayed to the base station to which the transmitting party belongs by the relay station;

2.2.2.1 After receiving the application, the base station to which the transmitting party belongs arranges resources for the relay station and the transmitting party and sends all resource assignment messages to the relay station, the relay station parses the resource assignment messages to obtain its own relay resources and the resource assignment message of the transmitting party and sends the resource assignment message of the transmitting party to the transmitting party, the transmitting party transmits to the relay station on a corresponding resource according to the resource assignment message as received, the relay station receives the data of the transmitting party on a corresponding resource according to the resource assignment message as received, and the relay station, after receiving the transmission data resource application of the transmitting party or the data of the transmitting party, generates a transmission data resource application and transmits it to the base station to which the receiving party belongs, and the base station to which the receiving party belongs, after receiving the application, arranges resources for the relay station and the receiving party and sends all resource assignment messages to the relay station, the relay station parses the resource assignment messages to obtain its own relay resources and the resource assignment message of the receiving party and sends the resource assignment message of the receiving party to the receiving party, the relay station transmits the data as received to the receiving party according to the resource assignment message as received, and the receiving party receives the data from the relay station on a corresponding resource according to the resource assignment message as received; or 2.2.2.2 After receiving the application, the base station to which the transmitting party belongs arranges resources for the relay station and the transmitting party and sends all resource assignment messages to the relay station, and negotiates with the base station to which the receiving party belongs through a backbone network so that the base station to which the receiving party belongs arranges resources for the relay station and the receiving party and sends all resource assignment messages to the relay station, the relay station parses the resource assignment messages to obtain its own relay resources and the resource assignment messages of the transmitting party and the receiving party, and sends the resource assignment message of the transmitting party to the transmitting party, the transmitting party transmits to the relay station on a corresponding resource according to the resource assignment message as received, the relay station receives the data of the transmitting party on a corresponding resource according to the resource assignment message as received, the relay station parses the resource assignment messages to obtain its own relay resources and the resource assignment message of the receiving party, and sends the resource assignment message of the receiving party to the receiving party, the relay station transmits the data as received to the receiving party according to the resource assignment message as received, and the receiving party receives the data from the relay station on a corresponding resource according to the resource assignment message as received; and 2.2.2.3 in the case that the base station cannot schedule resources after receiving the application, it sends a resource application reject message to the relay station, the relay station parses the resource application reject message to obtain the resource application reject message of the transmitting party and forwards the same to the transmitting party, and the transmitting party waits a period of time according to the application reject information as received and then re-sends the application or abandons the sending.

Example 2

Figure 3A:
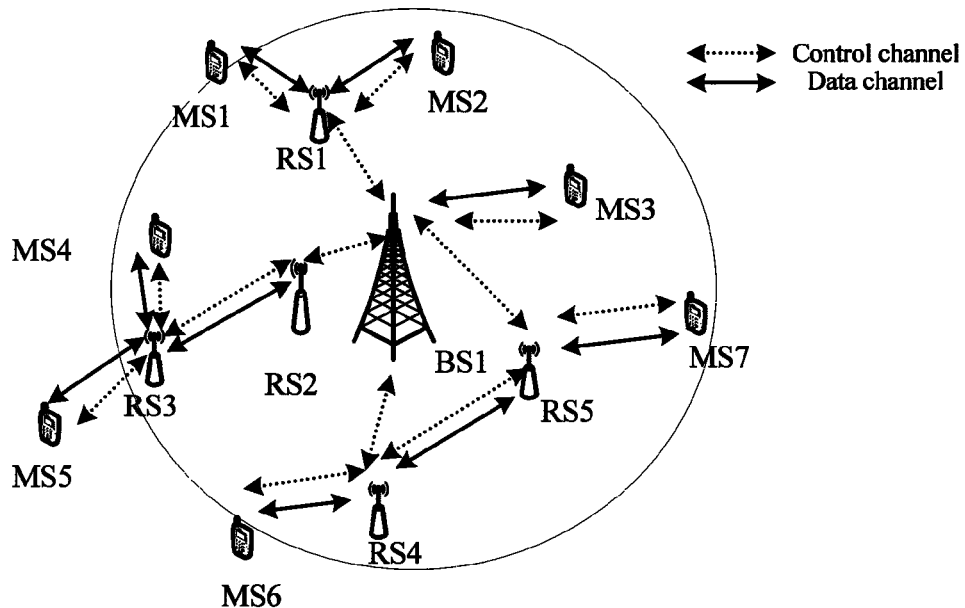
FIG. 3a is a schematic view of the network topology of example 2 that the method according to the embodiment of the present invention is used in an IEEE 802.16 system.

FIG. 3a is a schematic view of the network topology according to example 2 of the present invention, and as shown in FIG. 3a, the terminal (MS6) transmitting data accesses to the relay station RS4, and the terminal (MS7) receiving data accesses to the relay station RS5.

Specifically, the air interface resources can be scheduled by the relay station itself, the MS6 can directly apply for transmitting data resources to the RS5, and if the RS5, after receiving the application, may arrange resources, it arranges resources and sends a resource assignment message to the MS6, the MS6 transmits to the relay station on a corresponding resource according to the resource assignment message as received;

After receiving the transmission data resource application of or the data of the MS6, the RS5 applies for transmitting data resources from the BS1, the BS1 respectively sends a resource assignment message to the RS5 and RS6 according to the application, the RS5 transmits the data as received to the RS6 according to the resource assignment message as received, and the RS6 receives the data from the RS5 on a corresponding resource according to the resource assignment message as received;

After receiving the resource assignment message of the BS1 or the data of the RS5, the RS6 generates a resource assignment message and sends it to the MS7, and the MS7 receives the data transmitted from an access relay station connected with the receiving party on a corresponding resource according to the resource assignment message as received;

If the air interface resources can only be scheduled by the BS1, the MS6 applies for transmitting data resources from the RS5, and the RS5, after receiving the application, generates a new transmission data resource application and sends it to the BS1. If it is possible to arrange resources, the BS1 arranges all resources and sends a resource assignment message to the RS5 and RS6;

The RS5 parses the resource assignment messages to obtain its own relay resources and the resource assignment message of the MS6, and sends the resource assignment message of the MS6 to the MS6, the MS6 transmits to the relay station on a corresponding resource according to the resource assignment message as received, the RS5 receives the data of the MS6 on a corresponding resource according to the resource assignment message as received, and transmits the data as received to the RS6 on a corresponding resource; and The RS6 parses the resource assignment messages to obtain its own relay resources and the resource assignment message of the MS7, receives the data from the RS5 on a corresponding resource, sends the resource assignment message of the MS7 to the MS7, and transmits the data from the RS5 on a corresponding resource, and the MS7 receives the data from the access relay station on a corresponding resource according to the resource assignment message as received.

Figure 3B:
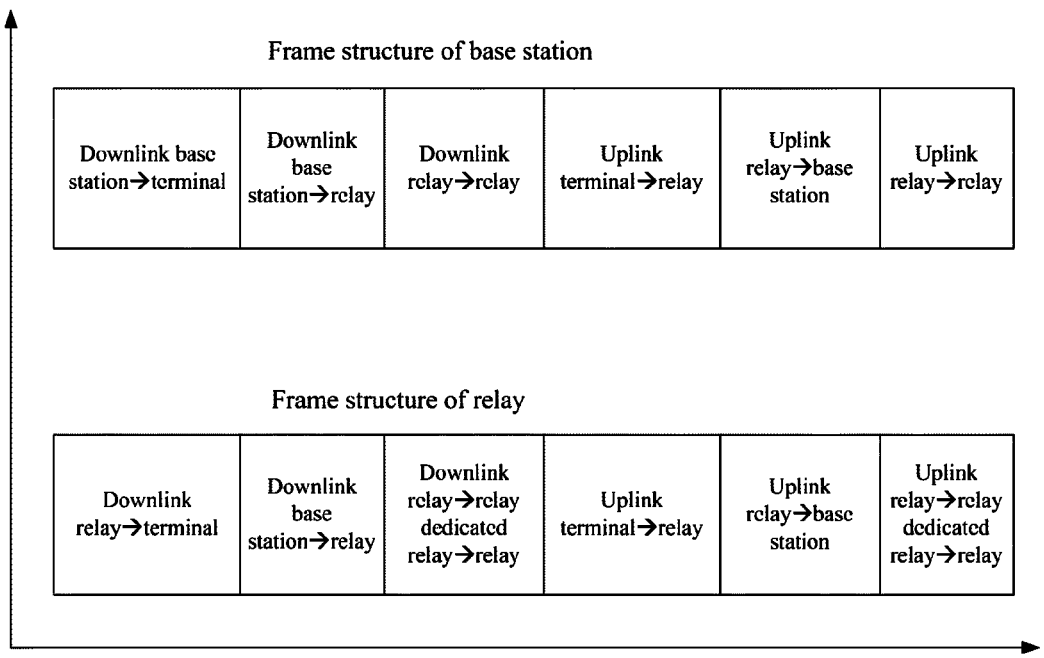
FIG. 3b is a schematic view of the frame structure of example 2 that the method according to the embodiment of the present invention is used in an IEEE 802.16 system.

FIG. 3b is a schematic view of the frame structure according to example 2 of the present invention, and as shown in FIG. 3b, the MS6 can transmit the data of the MS7 to the RS4 within an area of "uplink terminal→relay". The RS4 can directly transmit the data of the MS7 as received to the RS5 within an area of "dedicated relay→relay". According to related art, the RS4 transmits corresponding data to the BS1 within an area of "uplink relay→base station", then the RS5 receives the data within an area of "downlink base station→relay", and finally transmit to the MS7. Compared with the related art, the embodiment of the present invention reduces the number of times of forwarding data along the data transmission path.

Embodiment 3: the transmitting party and the receiving party access to the same base station through different relay stations, and the air interface resources are scheduled by the relay stations by themselves or scheduled by the base station.

3.1 When the air interface resources are scheduled by the relay stations themselves, the air interface resources are assigned proactively by the relay stations, or the transmitting party applies for the air interface resources from the relay stations;

3.1.1 The air interface resources being assigned proactively by the base station;

3.1.1.1 An access relay station connected with the transmitting party arranges resources for the transmitting party, receives the data of the transmitting party, and applies for transmitting data resources from the base station, the base station respectively sends a resource assignment message to the access relay station connected with the transmitting party and the access relay station connected with the receiving party according to the application, the access relay station connected with the transmitting party transmits the data as received to the access relay station connected with the receiving party according to the resource assignment message as received, and the access relay station connected with the receiving party receives the data transmitted from the access relay station connected with the transmitting party on a corresponding resource according to the resource assignment message as received; and After receiving the resource assignment message of the base station or receiving the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received; or 3.1.1.2 The access relay station connected with the transmitting party arranges resources for the transmitting party, receives the data of the transmitting party and directly negotiates with the access relay station connected with the transmitting party to obtain the resource assignment messages for the relay station to transmit and receive data, the access relay station connected with the transmitting party transmits the data as received to the access relay station connected with the receiving party according to the resource assignment message as negotiated, and the access relay station connected with the receiving party receives the data transmitted from the access relay station connected with the transmitting party on a corresponding resource according to the resource assignment message as negotiated; and After receiving the resource assignment message negotiated by the relay station or receiving the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received;

3.1.2 The transmitting party applies for the air interface resources from the relay station;

3.1.2.1 the transmitting party directly applies for transmitting data resources from the access relay station connected with the transmitting party, the access relay station connected with the transmitting party, after receiving the application, arranges resources and sends a resource assignment message to the transmitting party, and the transmitting party transmits to the relay station on a corresponding resource according to the resource assignment message as received;

After receiving the transmission data resource application of the transmitting party or receiving the data of the transmitting party, the access relay station connected with the transmitting party applies for transmitting data resources from the base station, the base station respectively sends a resource assignment message to the access relay station connected with the transmitting party and the access relay station connected with the receiving party according to the application, the access relay station connected with the transmitting party transmits the data as received to the access relay station connected with the receiving party according to the resource assignment message as received, and the access relay station connected with the receiving party receives the data transmitted from the access relay station connected with the transmitting party on a corresponding resource according to the resource assignment message as received;

After receiving the resource assignment message of the base station or receiving the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received;

3.1.2.2 in the case that the access relay station connected with the receiving party, after receiving the application, cannot perform resource scheduling, it sends a resource application reject message to the transmitting party, and the transmitting party waits a period of time according to the application reject information as received and then re-sends the application or abandons the sending;

3.2 When the air interface resources are scheduled by the base station, the air interface resources are assigned proactively by the base station, or the transmitting party applies for the air interface resources from the base station;

3.2.1 when the air interface resources are assigned proactively by the base station, the base station arranges all the resources and sends a resource assignment message to the access relay station connected with the transmitting party and the access relay station connected with the receiving party;

The access relay station connected with the transmitting party parses the resource assignment messages to obtain its own relay resources and the resource assignment message of the transmitting party, and transmits the resource assignment message of the transmitting party to the transmitting party, the transmitting party transmits to the access relay station connected with the transmitting party on a corresponding resource according to the resource assignment message as received, and the access relay station connected with the transmitting party receives the data of the transmitting party on a corresponding resource according to the resource assignment message as received, and transmits the data as received to the access relay station connected with the receiving party on a corresponding resource; and The access relay station connected with the receiving party parses the resource assignment messages to obtain its own relay resources and the resource assignment message of the receiving party, receives the data from the access relay station connected with the transmitting party on a corresponding resource, transmits the resource assignment message of the receiving party to the receiving party, and transmits the data from the access relay station connected with the transmitting party on a corresponding resource, and the receiving party receives the data from the access relay station on a corresponding resource according to the resource assignment message as received;

3.2.2 The transmitting party applies for the air interface resources from the base station;

3.2.2.1 The transmitting party applies for transmitting data resources from the access relay station connected with the transmitting party, the access relay station connected with the transmitting party, after receiving the application, generates a new transmission data resource application and sends it to the base station, and the base station arranges all the resources and sends a resource assignment message to the access relay station connected with the transmitting party and the access relay station connected with the receiving party;

The access relay station connected with the transmitting party parses the resource assignment messages to obtain its own relay resources and the resource assignment message of the transmitting party, and transmits the resource assignment message of the transmitting party to the transmitting party, the transmitting party transmits the air interface resources to the access relay station connected with the transmitting party on a corresponding resource according to the resource assignment message as received, and the access relay station connected with the transmitting party receives the data of the transmitting party on a corresponding resource according to the resource assignment message as received, and transmits the data as received to the access relay station connected with the receiving party on a corresponding resource; and The access relay station connected with the receiving party parses the resource assignment messages to obtain its own relay resources and the resource assignment message of the receiving party, receives the data from the access relay station connected with the transmitting party on a corresponding resource, transmits the resource assignment message of the receiving party to the receiving party, and transmits the data from the access relay station connected with the transmitting party on a corresponding resource, and the receiving party receives the data from the access relay station on a corresponding resource according to the resource assignment message as received;

3.2.2.2 in the case that the base station, after receiving the application, cannot perform resource scheduling, it sends a resource application reject message to the access relay station connected with the transmitting party, and the access relay station connected with the transmitting party parses the resource application reject message of the transmitting party from the resource application reject message and forwards it to the transmitting party, and the transmitting party waits a period of time according to the application reject information as received and then re-sends the application or abandons the sending.

Example 3

Figure 4A:
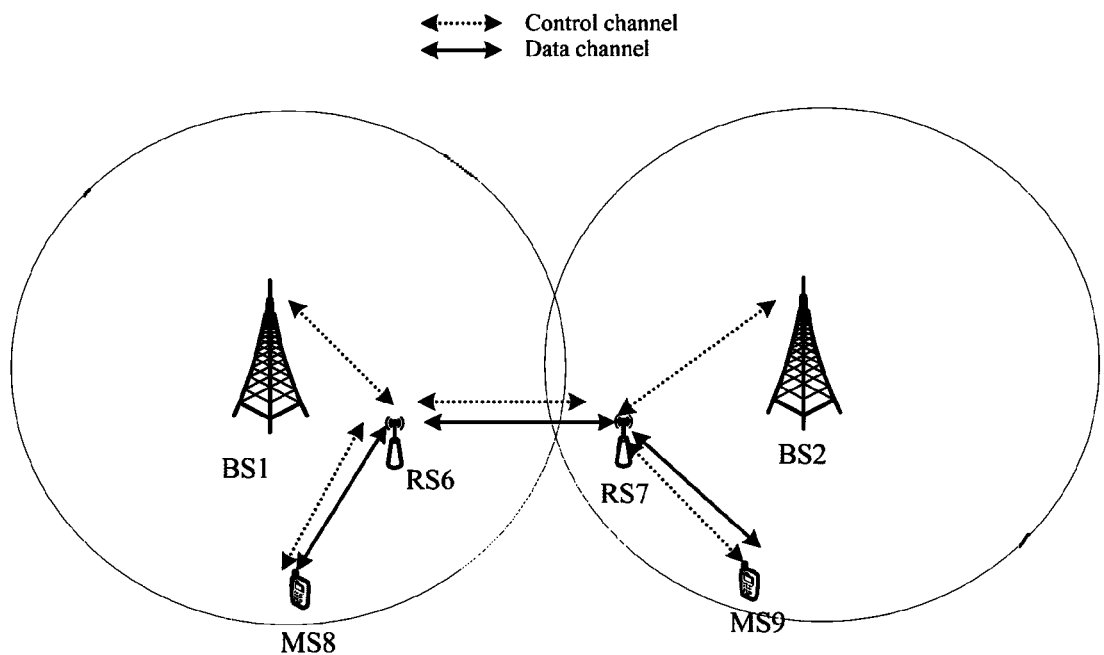
FIG. 4a is a schematic view of the network topology of example 3 that the method according to the embodiment of the present invention is used in an IEEE 802.16 system.

FIG. 4a is a schematic view of the network topology according to example 3 of the present invention, and as shown in FIG. 4a, the terminal (MS8) transmitting data and the terminal (MS9) receiving data respectively access to different relays RS6 and RS7 in different cells. For the purpose of simplicity, FIG. 4a does not show the RS1-RS5 or the MS1-MS7 already existing in FIG. 3a.

Specifically, if the air interface resources can be scheduled by the relay station itself, the MS8 can directly apply for transmitting data resources to the RS6, and if the RS6, after receiving the application, may arrange resources, it arranges resources and sends a resource assignment message to the MS8, the MS8 transmits to the RS6 on a corresponding resource according to the resource assignment message as received;

After receiving the transmission data resource application of or the data of the MS8, the RS6 applies for transmitting data resources from the BS1, the base station to which the transmitting party belongs negotiates with the base station to which the MS9 belongs through a backbone network according to the application, the base station to which the transmitting party belongs sends a resource assignment message to the access relay station connected with the transmitting party, the BS2i sends a resource assignment message to the RS7, the RS6 sends the data as received to the RS7 according to the resource assignment message as received, and the RS7 receives the data from the RS6 on a corresponding resource according to the resource assignment message as received;

After receiving the resource assignment message of the base station or the data of the RS6, the RS7 generates a resource assignment message and sends it to the MS9. The MS9 receives the data transmitted from the access relay station connected with the receiving party on a corresponding resource according to the resource assignment message as received.

If the air interface resources can only be scheduled by the base station, the MS8 applies for transmitting data resources from the RS6, and the RS6 generates a new transmission data resource application after receiving the application and sends it to the BS1. If it is possible to arrange resources, the BS1 negotiates with the base station to which the MS9 belongs through a backbone network according to the application, arranges all resources and sends a resource assignment message to the RS6 and RS7;

The RS7 parses the resource assignment messages to obtain its own relay resources and the resource assignment message of the MS8, and sends the resource assignment message of the MS8 to the MS8, the MS8 transmits to the RS6 on a corresponding resource according to the resource assignment message as received, the RS6 receives the data of the MS8 on a corresponding resource according to the resource assignment message as received, and transmits the data as received to the RS7 on a corresponding resource; and The RS7 parses the resource assignment messages to obtain its own relay resources and the resource assignment message of the MS9, receives the data from the RS6 on a corresponding resource, sends the resource assignment message of the MS9 to the MS9, and transmits the data from the RS6 on a corresponding resource, and the MS9 receives the data from the access relay station on a corresponding resource according to the resource assignment message as received.

Figure 4B:
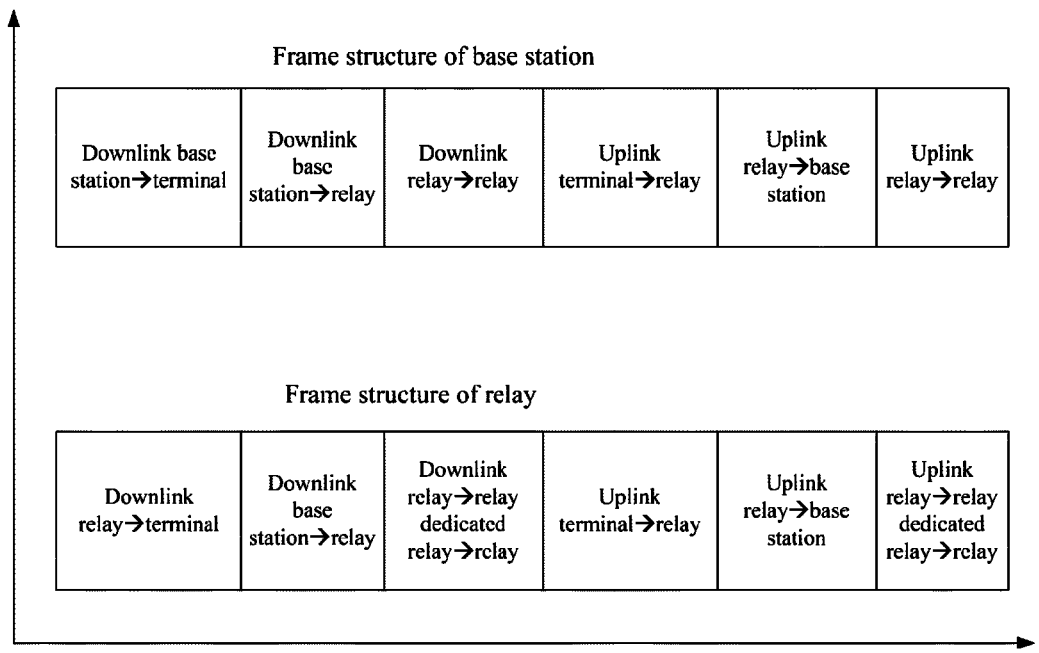
FIG. 4b is a schematic view of the frame structure of example 3 that the method according to the embodiment of the present invention is used in an IEEE 802.16 system.

FIG. 4b is a schematic view of the frame structure according to example 3 of the present invention, and as shown in FIG. 4b, the MS8 can transmit the data given to the MS8 to the RS6 within an area of "uplink terminal→relay". The RS6 can directly transmit the data of the MS8 as received to the RS7 within an area of "dedicated relay→relay". The RS7 can directly transmit the data of the MS8 as received to the MS9 within an area of "dedicated relay→terminal". According to related art, the RS4 transmits corresponding data to the BS1 within an area of "uplink relay→base station", then the BS1 transmits the data to the BS2 through a backbone, the RS7 receives the data within an area of "downlink base station→relay" of the BS2, and finally transmit to the MS9. Compared with the related art, the embodiment of the present invention reduces the number of times of forwarding data along the data transmission path.

Embodiment 4: the transmitting party and the receiving party access to different base stations through different relay stations, and the air interface resources are scheduled by the relay stations themselves or scheduled by the base stations.

4.1 When the air interface resources are scheduled by the relay stations themselves, the air interface resources are assigned proactively by the relay stations, or the transmitting party applies for the air interface resources from the relay stations;

4.1.1 When the air interface resources are assigned by the relay stations themselves, 4.1.1.1 An access relay station connected with the transmitting party arranges resources for the transmitting party, receives the data of the transmitting party and applies for transmitting data resources from the base station to which the transmitting party belongs, the base station to which the transmitting party belongs respectively sends a resource assignment message to the access relay station connected with the transmitting party and the access relay station connected with the receiving party after negotiating with the base station to which the receiving party belongs according to the application, the access relay station connected with the transmitting party transmits the data as received to the access relay station connected with the receiving party according to the resource assignment message as received, and the access relay station connected with the receiving party receives the data transmitted from the access relay station connected with the transmitting party on a corresponding resource according to the resource assignment message as received; and After receiving the resource assignment message of the base station or the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received; or 4.1.1.2 When the air interface resources are assigned proactively by the relay stations, the access relay station connected with the transmitting party arranges resources for the transmitting party, receives the data of the transmitting party, and directly negotiates with the access relay station connected with the transmitting party to obtain the resource assignment messages for the relay station to transmit and receive data, the access relay station connected with the transmitting party transmits the data as received to the access relay station connected with the receiving party according to the resource assignment message as negotiated, and the access relay station connected with the receiving party receives the data transmitted from the access relay station connected with the transmitting party on a corresponding resource according to the resource assignment message as negotiated; and After receiving the resource assignment message negotiated by the relay stations or the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received;

4.1.2 When the transmitting party applies for the air interface resources from the relay stations, 4.1.2.1 the transmitting party directly applies for transmitting data resources from the access relay station connected with the transmitting party, the access relay station connected with the transmitting party, after receiving the application, arranges resources and sends a resource assignment message to the transmitting party, and the transmitting party transmits to the relay station on a corresponding resource according to the resource assignment message as received;

After receiving the transmission data resource application of the transmitting party or the data of the transmitting party, the access relay station connected with the transmitting party applies for transmitting data resources from the base station to which the transmitting party belongs, the base station to which the transmitting party belongs negotiates with the base station to which the receiving party belongs through a backbone network according to the application and sends a resource assignment message to the access relay station connected with the transmitting party, the base station to which the receiving party belongs sends a resource assignment message to the access relay station connected with the receiving party, the access relay station connected with the transmitting party transmits the data as received to the access relay station connected with the receiving party according to the resource assignment message as received, and the access relay station connected with the receiving party receives the data transmitted from the access relay station connected with the transmitting party on a corresponding resource according to the resource assignment message as received;

After receiving the resource assignment message of the base station or the data of the access relay station connected with the transmitting party, the access relay station connected with the receiving party generates a resource assignment message and sends it to the receiving party. The receiving party receives the data transmitted from the access relay station connected with the receiving party on a corresponding resource according to the resource assignment message as received;

4.1.2.2 in the case that the access relay station connected with the transmitting party, after receiving the application, cannot perform resource scheduling, it sends a resource application reject message to the transmitting party, and the transmitting party waits a period of time according to the application reject information as received and then re-sends the application or abandons the sending;

4.2 When the air interface resources are scheduled by the base stations, the air interface resources are assigned proactively by the base stations, or the transmitting party applies for the air interface resources from the base stations;

4.2.2 when the transmitting party applies for the air interface resources from the base stations, the base station to which the transmitting party belongs negotiates with the base station to which the receiving party belongs through a backbone network, arranges all resources and sends a resource assignment message to the access relay station connected with transmitting party and the access relay station connected with the receiving party, or directly transmits a resource assignment message to the access relay station connected with transmitting party and the access relay station connected with the receiving party;

The access relay station connected with the transmitting party parses the resource assignment messages to obtain its own relay resources and the resource assignment message of the transmitting party and transmits the resource assignment message of the transmitting party to the transmitting party, the transmitting party transmits to the access relay station connected with the transmitting party on a corresponding resource according to the resource assignment message as received, and the access relay station connected with the transmitting party receives the data of the transmitting party on a corresponding resource according to the resource assignment message as received and transmits the data as received to the access relay station connected with the receiving party on a corresponding resource; and The access relay station connected with the receiving party parses the resource assignment messages to obtain its own relay resources and the resource assignment message of the receiving party, receives the data from the access relay station connected with the transmitting party on a corresponding resource, transmits the resource assignment message of the receiving party to the receiving party, and transmits the data from the access relay station connected with the transmitting party on a corresponding resource, and the receiving party receives the data from the access relay station on a corresponding resource according to the resource assignment message as received;

4.2.2.1 The transmitting party applies for transmitting data resources from the access relay station connected with the transmitting party, the access relay station connected with the transmitting party, after receiving the application, generates a new transmission data resource application and sends it to the base station to which the transmitting party belongs, and the base station to which the transmitting party belongs negotiates with the base station to which the receiving party belongs through a backbone network according to the application, arranges all the resources and sends a resource assignment message to the access relay station connected with the transmitting party and the access relay station connected with the receiving party;

The access relay station connected with the transmitting party parses the resource assignment messages to obtain its own relay resources and the resource assignment message of the transmitting party, and transmits the resource assignment message of the transmitting party to the transmitting party, the transmitting party transmits to the access relay station connected with the transmitting party on a corresponding resource according to the resource assignment message as received, and the access relay station connected with the transmitting party receives the data of the transmitting party on a corresponding resource according to the resource assignment message as received, and transmits the data as received to the access relay station connected with the receiving party on a corresponding resource; and The access relay station connected with the receiving party parses the resource assignment messages to obtain its own relay resources and the resource assignment message of the receiving party, receives the data from the access relay station connected with the transmitting party on a corresponding resource, transmits the resource assignment message of the receiving party to the receiving party, and transmits the data from the access relay station connected with the transmitting party on a corresponding resource, and the receiving party receives the data from the access relay station on a corresponding resource according to the resource assignment message as received;

4.2.2.2 in the case that the base station to which the transmitting party belongs, after receiving the application, cannot perform resource scheduling, it sends a resource application reject message to the relay station, and the relay station parses the resource application reject message of the transmitting party from the resource application reject message and forwards it to the transmitting party, and the transmitting party waits a period of time according to the application reject information as received and then re-sends the application or abandons the sending.

Example 4

Figure 5:
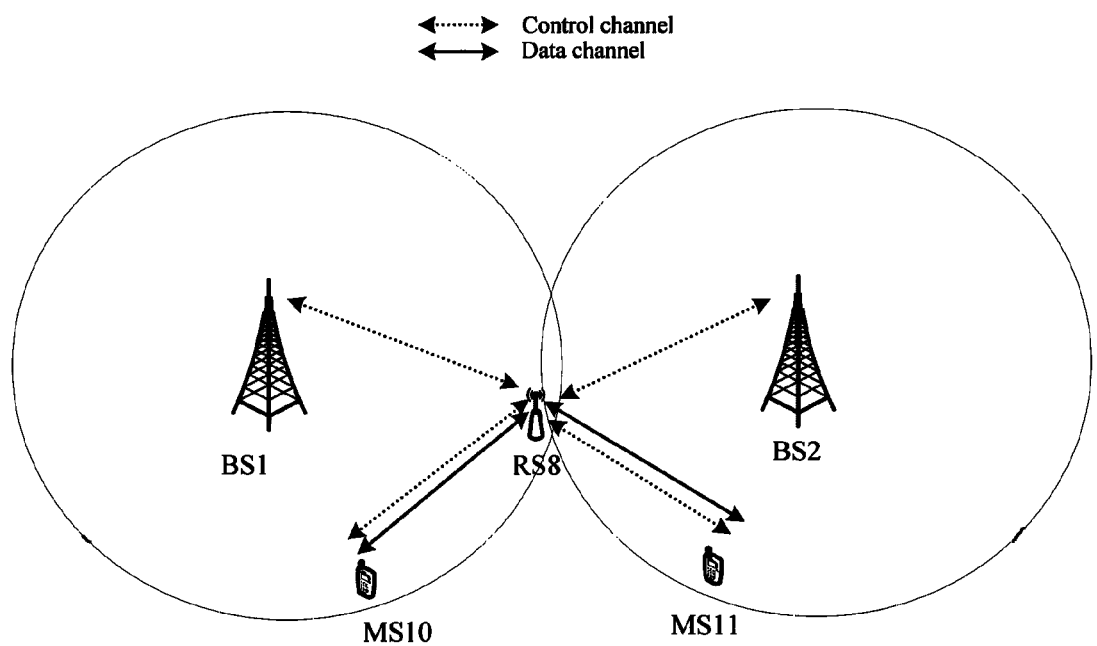
FIG. 5 is a schematic view of the network topology of example 4 that the method according to the embodiment of the present invention is used in an IEEE 802.16 system.

FIG. 5 is a schematic view of the network topology of example 4 according to the present invention, and as shown in FIG. 5, a scenario is added in example 4 of the present invention on the basis of examples 2 and 3, and the terminals (MS10 and MS11) transmitting and receiving data access to the same relay RS8 in different cells. The RS8 accesses to different cells through different resources. For the purpose of simplicity, FIG. 5 does not show the preceding RS1-RS7 and MS1-MS9.

If the air interface resources can be scheduled by the RS8 itself, the MS10 can directly apply for transmitting data resources to the RS8, and if the RS8, after receiving the application, may arrange resources, it arranges resources and respectively sends a resource assignment message to the MS10 and the MS11, the MS10 transmits to the RS8 on a corresponding resource according to the resource assignment message as received, the RS8 directly transmits the data as received to the MS11, and the MS11 receives the data from the RS 8 on a corresponding resource according to the resource assignment message as received;

If the air interface resources can only be scheduled by the base station, the transmission data resource application of the MS10 must be relayed to the BS1 through the RS8, if the BS1, after receiving the application, may arrange resources, it arranges resources for the RS8 and the MS10 and sends all resource assignment messages to the RS8, the RS8 parses the resource assignment messages to obtain its own relay resources and the resource assignment message of the MS10 and sends the resource assignment message of the MS10 to the MS10, the MS10 transmits to the RS8 on a corresponding resource according to the resource assignment message as received, the RS8 receives the data of the MS10 on a corresponding resource according to the resource assignment message as received, the RS8, after receiving the transmission data resource application of or the data of the MS10, generates a transmission data resource application and sends it to the BS2, and if the BS2, after receiving the application, may arrange resources, it arranges resources for the RS8, and the MS11 and sends all resource assignment messages to the RS8, the RS8 parses the resource assignment messages to obtain its own relay resources and the resource assignment message of the MS11, and sends the resource assignment message of the MS11 to the MS11, the RS8 transmits the data as received to the MS11 according to the resource assignment message as received, and the MS11 receives the data of the RS8 on a corresponding resource according to the resource assignment message as received.

Preferably, in the above embodiments of the relay communication system, when the above relay station accesses to the base station through other relay stations, the resource application of the data and the resource assignment message are relayed by other relay stations.

Also, the physical layer of the above relay communication system may use, but not limited to, an Orthogonal Frequency Division Multiplexing Access (OFDMA for short) technology.

The duplex mode of the above relay station may use, but not limited to, Time Division Duplex (TDD for short) and Frequency Division Duplex (FDD for short).

In addition, the above relay communication system defines the combination of frequencies and OFDM symbols (time slots) in the uplink/downlink frame of the relay station, as the above data transmission resources.

System Embodiment

According to an embodiment of the present invention, a relay communication system is further provided. The system can be used to realize the above data transmitting methods for transmitting data in the relay communication system provided by the above embodiments.

Figure 6:
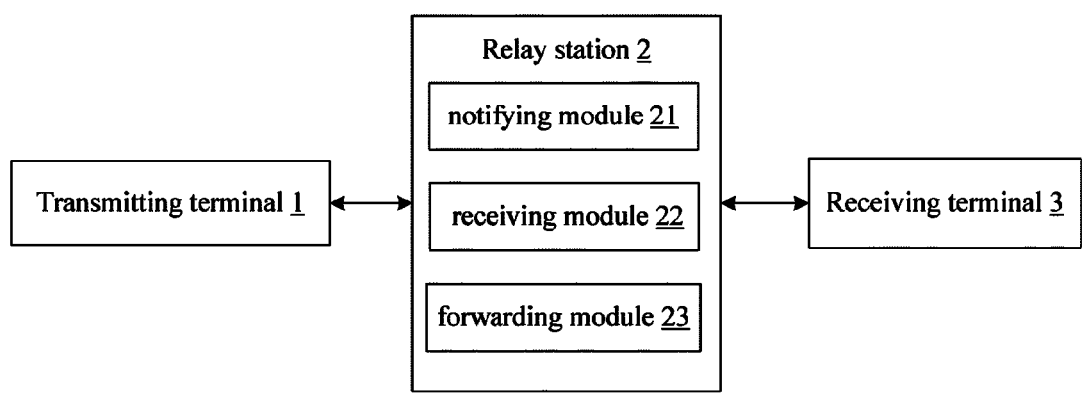
FIG. 6 is a block diagram of the structure of the relay communication system according to the embodiment of the present invention.

FIG. 6 is a block diagram of the structure of the relay communication system according to the embodiment of the present invention, and as shown in FIG. 6, the system comprises: a transmitting terminal 1, a relay station 2, and a receiving terminal 3.

Wherein, the relay station 2 further comprises: a notifying module 21, respectively connected to the transmitting terminal 1 and the receiving terminal 3 and configured to notify the transmitting terminal 1 and the receiving terminal 3 of air interface resources which are required when the transmitting terminal 1 transmits data and when the receiving terminal 3 receives data; a receiving module 22, connected to the transmitting terminal 1 and configured to receive the data from the transmitting terminal 1 on the air interface recourses; and a forwarding module 23, connected to the receiving terminal 3 and configured to forward the data from the transmitting terminal 1 to the receiving terminal 3 on the air interface resources.

It needs to be explained that, though FIG. 6 schematically shows one transmitting terminal 1, one relay station 2 and one receiving terminal 3, respectively, there may be one or more of the transmitting terminal 1, the relay station 2 and the receiving terminal 3 of the relay communication system according to the embodiment of the present invention.

During specific implementation, the relay communication system provided by the embodiment of the present invention can also execute the processing shown in FIG. 1 to FIG. 5, and the specific processing is omitted herein.

In view of the above description, by way of the above technical solutions of the present invention, the relay station forwards the data from the transmitting terminal to the receiving terminal through the air interface resources, which can effectively reduce the number of times of forwarding data at the data transmission path, thereby improving the data transmission efficiency and saving network resources.

Obviously, those skilled in the art shall understand that various modules or steps described above can be realized with general computing devices and can be integrated into one single computing device or distributed within a network consisting of multiple computing devices, and alternatively, the various modules or steps can be realized with program codes executable by the computing devices, and thus these program codes can be stored in memory devices so as to be executed by the computing devices, or the various modules and steps described above can be formed into individual integrated circuit modules, or a plurality of the modules or steps can be formed into a single integrated circuit module so as to be realized. Therefore, the present invention is not limited to any particular hardware or software combination.

The above descriptions are just preferable embodiments of the present invention and do not intend to limit the same. For those skilled in the art, various modifications and changes can be made to the present invention. Any modification, equivalent substitution, improvement and etc. within the spirit and principle of the present invention should be contained within the scope of protection of the present invention.

What is claimed is:

1. A method for transmitting data in a relay communication system, the relay communication system comprising one or more relay stations, one or more transmitting terminals, and one or more receiving terminals, wherein the method comprises:

a relay station notifying a transmitting terminal and a receiving terminal of air interface resources which are required when the transmitting terminal transmits data and when the receiving terminal receives the data; and the transmitting terminal transmitting the data to the relay station on the air interface resources, and the relay station forwarding the data from the transmitting terminal to the receiving terminal on the air interface resources.

2. A method for transmitting data in a relay communication system, the relay communication system comprises one or more relay stations, one or more transmitting terminals, and one or more receiving terminals, wherein the method comprises:

the relay station transmitting air interface resources required when the transmitting terminal transmits data directly to the transmitting terminal or through one or more relay stations;

the transmitting terminal transmitting the data directly to the relay station on the air interface resources or through one or more relay stations;

the relay station transmitting the air interface resources, required when the receiving terminal receives the data, and the data from the transmitting terminal directly to the receiving terminal or through one or more relay stations; and the receiving terminal receiving the data on the air interface resources.

3. A relay communication system, comprising: one or more relay stations, one or more transmitting terminals, and one or more receiving terminals, wherein the relay station comprises:

a notifying module, configured to notify the transmitting terminal and the receiving terminal of air interface resources which are required when the transmitting terminal transmits data and when the receiving terminal receives data;

a receiving module, configured to receive the data from the transmitting terminal on the air interface recourses resources;

a forwarding module, configured to forward the data from the transmitting terminal to the receiving terminal on the air interface resources.

\* \* \* \* \*